(12) United States Patent
Sharma et al.

(10) Patent No.: US 10,678,663 B1
(45) Date of Patent: Jun. 9, 2020

(54) SYNCHRONIZING STORAGE DEVICES OUTSIDE OF DISABLED WRITE WINDOWS

(71) Applicant: EMC IP Holding Company LLC, Hopkinton, MA (US)

(72) Inventors: Satyendra Nath Sharma, Bangalore (IN); Shubhashish Mallik, Bangalore (IN); Manuel Rodriques, Sutton, MA (US); Alex Zorrilla, Northbridge, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 605 days.

(21) Appl. No.: 14/672,577

(22) Filed: Mar. 30, 2015

(51) Int. Cl.
*G06F 11/00* (2006.01)
*G06F 11/20* (2006.01)
*G06F 11/14* (2006.01)

(52) U.S. Cl.
CPC ...... *G06F 11/2064* (2013.01); *G06F 11/1446* (2013.01); *G06F 11/1451* (2013.01); *G06F 11/1466* (2013.01); *G06F 11/1469* (2013.01); *G06F 11/2069* (2013.01); *G06F 11/2082* (2013.01); *G06F 2201/84* (2013.01)

(58) Field of Classification Search
CPC ............ G06F 11/1466; G06F 11/1451; G06F 2201/84; G06F 11/1469; G06F 11/2069; G06F 11/2082
See application file for complete search history.

(56) References Cited

U.S. PATENT DOCUMENTS

| | | | | |
|---|---|---|---|---|
| 7,234,073 B1 * | 6/2007 | Roytman | ............ | G06F 11/2025 714/4.11 |
| 8,966,211 B1 * | 2/2015 | Arnon | ................... | G06F 13/102 370/338 |
| 2005/0114410 A1 * | 5/2005 | Fujibayashi | ........ | G06F 11/2082 |
| 2005/0198083 A1 * | 9/2005 | Saika | .................... | G06F 3/0608 |
| 2010/0179941 A1 * | 7/2010 | Agrawal | ............. | G06F 11/1451 707/624 |
| 2011/0099148 A1 * | 4/2011 | Bruning, III | ........ | G06F 11/1004 707/639 |
| 2011/0167235 A1 * | 7/2011 | Inoue | .................... | G06F 3/0605 711/162 |
| 2012/0226877 A1 * | 9/2012 | Clayton | .............. | G06F 11/1456 711/162 |
| 2013/0138903 A1 * | 5/2013 | Matsui | .................. | G06F 3/0605 711/162 |
| 2017/0308602 A1 * | 10/2017 | Raghunathan | ...... | G06F 16/2365 |

FOREIGN PATENT DOCUMENTS

WO  WO-2016111697 A1 * 7/2016 ....... G06F 17/30578

* cited by examiner

*Primary Examiner* — Diedra McQuitery (74) *Attorney, Agent, or Firm* — Dergosits & Noah LLP; Todd A. Noah (57) ABSTRACT

Synchronizing storage devices outside of disabled write windows is described. A system receives, via a backup/restore application interface, a list of identifiers corresponding to source storage devices to be backed up. The system enables a target storage device to synchronize with a source storage device. The system sends, via the backup/restore application interface, a request to disable any write commands to the source storage devices corresponding to the list of identifiers. The system creates a snapshot of the source storage device. The system sends, via the backup/restore application interface, a request to enable any write commands to the source storage devices corresponding to the list of identifiers.

17 Claims, 3 Drawing Sheets

SYNCHRONIZING STORAGE DEVICES OUTSIDE OF DISABLED WRITE WINDOWS

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object.

A snapshot is a capture of a state of a data object, such as a file system or an application, at a specific moment in time. A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create snapshots of data objects stored on multiple storage arrays.

DETAILED DESCRIPTION

Although a snapshot in itself is very quick, target storage device identification and synchronization are still legacy processes that are very slow. For example, every time that a backup operation is required for multiple servers, legacy processes flush pending writes from the servers' memories to the servers storage devices, temporarily disable any write requests to the servers' storage devices, identify available mirror storage devices for the servers' storage devices, synchronize the available mirror storage devices with the servers' storage devices, snapshot the data in the servers' storage devices by splitting the synchronized mirror storage devices from the servers' storage devices, and then enable any write requests to the servers' storage devices. Many system users require these snapshots to be taken at the same time, which eliminates the possibility of backing up the data in the source storage devices as a series of separate batch processes.

Furthermore, some legacy processes fail a backup operation for all of the source storage devices if even one source storage device does not have a target storage device or is not synchronized with a target storage device. Legacy processes take advantage of snapshots, but the relatively slow identification and synchronization processes occur during the disabled write window, which leads to a lower total customer experience, particularly when attempts to write data are temporarily disabled for the long period of time required to identify available target storage devices and synchronize the available target storage devices.

Embodiments herein provide synchronizing storage devices outside of disabled write windows. A list of identifiers corresponding to source storage devices to be backed up is received via a backup/restore application interface. A target storage device is enabled to synchronize with a source storage device. A request to disable any write commands to the source storage devices corresponding to the list of identifiers is sent via the backup/restore application interface. A snapshot is created of the source storage device. A request to enable any write commands to the source storage devices corresponding to the list of identifiers is sent via the backup/restore application interface.

For example, a backup/restore application receives, via a backup/restore application interface, a list of logical unit numbers (LUNs) corresponding to source storage devices to be backed up, including a personal computer. The backup/restore application enables a storage array disk to synchronize with the personal computer. The backup/restore application sends, via the backup/restore application interface, a request to disable any write commands to the source storage devices corresponding to the list of logical unit numbers (LUNs), including the personal computer. The backup/restore application creates a snapshot of the personal computer by splitting the storage array disk from the personal computer. The backup/restore application sends, via the backup/restore application interface, a request to enable any write commands to the source storage devices corresponding to the list of logical unit numbers (LUNs), including the personal computer.

The backup/restore application moves the identification and synchronization of target storage devices out of the disabled write windows, thereby overcoming challenges in the legacy identification and synchronization process. When the identification and synchronization of target storage devices are decoupled from the disabled write windows, the overall disabled write time is significantly reduced to the bare minimum. The backup/restore application also provides the benefit of performing a partial snapshot backup of multiple source storage devices when not all of these target storage devices can be identified for or synchronized with source storage devices. The backup/restore application overcomes a problem specifically arising with legacy identification and synchronization processes, which require the identification and synchronization of target storage devices within every disabled write window.

Figure 1:
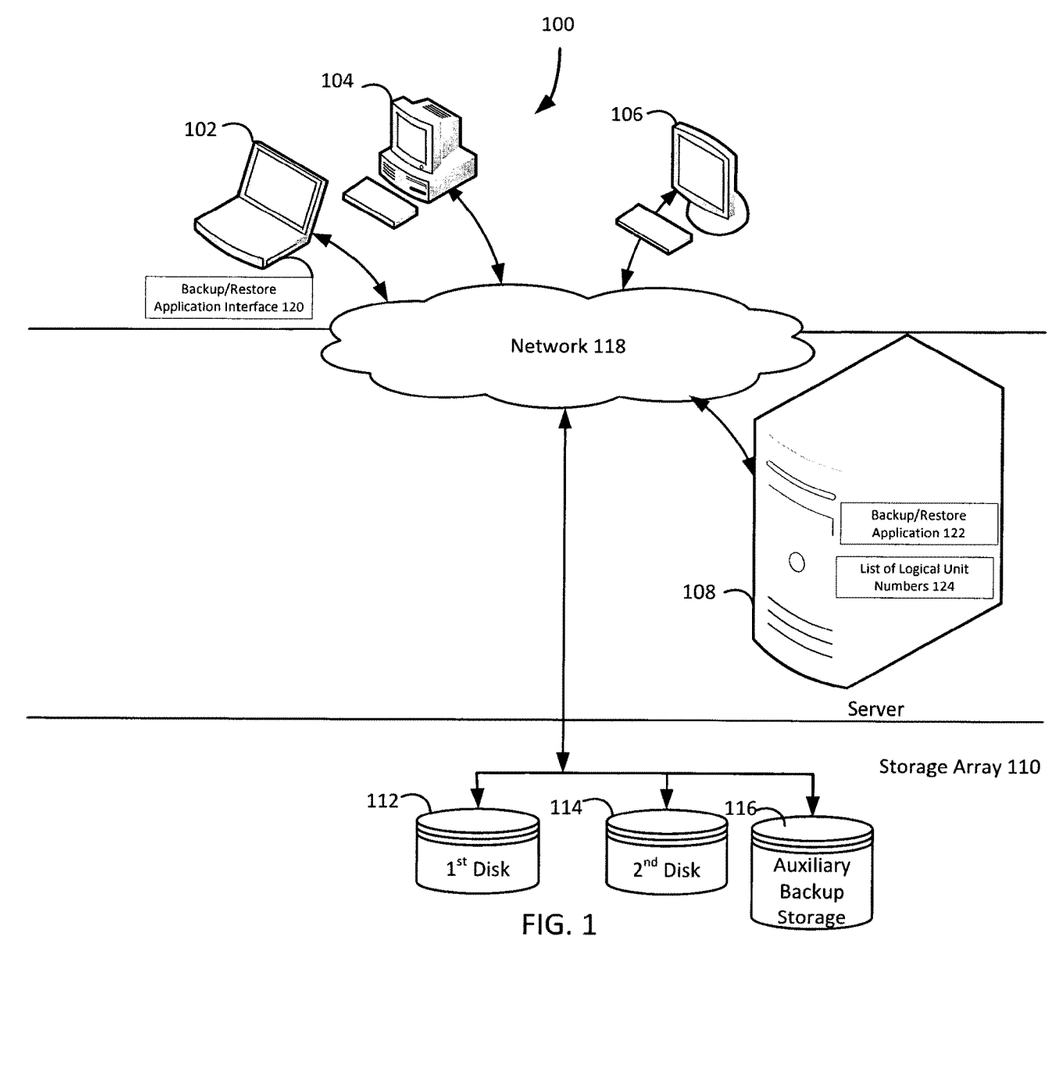
FIG. 1 illustrates a block diagram of an example system for synchronizing storage devices outside of disabled write windows, under an embodiment.

FIG. 1 illustrates a block diagram of a system that implements synchronizing storage devices outside of disabled write windows, under an embodiment. As shown in FIG. 1, a system 100 may illustrate a cloud computing environment in which data, applications, services, and other resources are stored and delivered through shared datacenters and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a server 108 and a storage array 110 that may be provided by a hosting company. Although FIG. 1 depicts the first client 102 as a laptop 102, the second client 104 as a personal computer 104, and the third client 106 as an iMac® 106, each of the clients 102-106 may be any type of computer, such as a server. The storage array 110 includes a first disk 112, a second disk 114, and an auxiliary storage device 116. The clients 102-106, the server 108, and the storage array 110 communicate via a network 118. Although FIG. 1 depicts the system 100 with three clients 102-106, one server 108, one storage array 110, two disks 112-114, one auxiliary storage device 116, and one network 118, the system 100 may include any number of clients 102-106, any number of servers 108, any number of storage arrays 110, any number of disks 112-114, any number of auxiliary storage devices 116, and any number of networks 118. The clients 102-106 and the server 108 may each be substantially similar to the system 300 depicted in FIG. 3 and described below.

The first client includes a backup/restore application interface 120, such as the backup software interface provided by Medical Information Technology, Inc., which enables a system user to interface with a backup/restore application 122. The server 108 includes the backup/restore application 122, and a list of logical unit numbers (LUNs) 124, which correspond to source storage devices to be backed up. The backup/restore application 122 creates snapshots of data objects for the clients 104-106, by synchronizing the disks 112-114 with the clients 104-106. The system 100 enables the backup/restore application 122 to execute a rollback based on the snapshots. FIG. 1 depicts the system elements 122-124 residing completely on the server 108, but the system elements 122-124 may reside completely on the clients 102-106, completely on another server that is not depicted in FIG. 1, or in any combination of partially on the server 108, partially on the clients 102-106, and partially on the other server. Although the following paragraphs describe EMC Corporation's Avamar® backup/restore application and EMC Corporation's NetWorker® backup/restore application as examples of the backup/restore application 122, the backup/restore application 122 may be any other backup/restore application which provides the backup/restore functionalities described in the Background section.

In an embodiment, the backup/restore application 122 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

In some embodiments, the backup/restore application 122 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

In an embodiment, the backup/restore application 122 may identify, via a backup/restore application interface, each client which requires backup at the same point in time as a group which corresponds to a list of identifiers. For example, the backup/restore application 122 identifies, via the backup/restore application interface 120, the personal computer 104 and the iMac® 106, which require backup at the same point in time as a group, which corresponds to a list of logical unit numbers (LUNs) for the personal computer 104 and the iMac® 106. After identifying the group which corresponds to the list of identifiers, the backup/restore application 122 receives, via a backup/restore application interface, the list of identifiers corresponding to the source storage devices to be backed up. For example, the backup/restore application 122 receives, via the backup/restore application interface 120, the list of logical unit numbers (LUNs) 124 corresponding to the personal computer 104 and the iMac® 106. The backup/restore application 122 receives a list of source segments with corresponding World Wide Names (WWNs) which are always residing on storage devices identified by logical unit numbers (LUNs) and identified with unique World Wide Names (WWNs).

In an embodiment, the backup/restore application 122 can determine whether a target storage device is available for each source storage device in the list of identifiers corresponding to the group of source storage devices to be backed up after the list of identifiers is received. For example, the backup/restore application 122 determines whether the first disk 112 is available for mirroring the personal computer 104 and whether the second disk 114 is available for mirroring the iMac® 106. The backup/restore application 122 can remove an identifier corresponding to a source storage device from the list of identifiers if a target storage device is not available for the source storage device. For example, the backup/restore application 122 removes the logical unit number (LUN) for the personal computer 104 from the list of logical unit numbers (LUNs) 124 if the first disk 112 is not available for the personal computer 104, and removes the logical unit number (LUN) for the iMac® 106 from the list of logical unit numbers (LUNs) 124 if the second disk 114 is not available for the iMac® 106. The backup/restore application 122 ensures that the list of logical unit numbers (LUNs) 124 includes only logical unit numbers which have a very high probability of being successfully snapshotted by making sure that there is no issue with the corresponding target logical unit numbers. By identifying available target storage devices outside of the disabled write window, the backup/restore application 122 reduces the time that write requests are disabled to the source storage devices.

The backup/restore application 122 enables the available target storage devices to synchronize with the source storage devices after the target storage devices are identified as available. For example, the backup/restore application 122 enables the first disk 112 to synchronize with the personal computer 104 in response to a determination that the first disk 112 is available for mirroring the personal computer 104, and enables the second disk 114 to synchronize with the iMac® 106 in response to a determination that the second disk 114 is available for mirroring the iMac® 106.

The backup/restore application 122 can determine whether the available target storage devices are synchronized with the source storage devices. For example, the backup/restore application 122 determines whether the first disk 112 is synchronized with the personal computer 104 and determines whether the second disk 114 is synchronized with the iMac® 106. The backup/restore application 122 can remove an identifier corresponding to a source storage device from a list of identifiers if a target storage device is not synchronized with the source storage device. For example, the backup/restore application 122 removes the logical unit number (LUN) for the personal computer 104 from the list of logical unit numbers (LUNs) 124 if the first disk 112 is not synchronized with the personal computer 104, and removes the logical unit number (LUN) for the iMac® 106 from the list of logical unit numbers (LUNs) 124 if the second disk 114 is not synchronized with the iMac® 106. The backup/restore application 122 ensures that the list of logical unit numbers (LUNs) 124 includes only logical unit numbers which have a very high probability of being successfully snapshotted by making sure that there is no issue with the corresponding target logical unit numbers. By synchronizing target storage devices outside of the disabled write window, the backup/restore application 122 reduces the time that write requests are disabled to the source storage devices.

After preparing the target storage devices outside the disabled write window by identifying the target storage devices as available and synchronizing the available target storage devices with the source storage devices, the backup/restore application 122 sends, via a backup/restore application interface, a request to disable any write commands to the source storage devices corresponding to the list of identifiers. For example, the backup/restore application 122 sends, via the backup/restore application interface 120, a request to quiesce, or disable any write commands to, the source storage devices corresponding to the list of logical unit numbers (LUNs) 124, including the personal computer 104 and the iMac® 106.

When the backup/restore application interface 120 needs to quiesce, or disable any write commands to, a source storage device, the backup/restore application interface 120 may initially flush any pending write commands from cache or memory to the source storage device before temporarily disabling subsequent write commands to the source storage device, thereby resulting in the most current version of the data on the source storage device. Since the data on the target storage device is a mirror of the data on the source storage device, the flushing of the data in the cache or the memory to the source storage device also results in the flushing of the data in the cache or the memory to the target storage device, such that the target storage device maintains a consistent mirror of the data on the source storage device. The backup/restore application 122 requests the temporary disabling of write commands only for the source storage devices whose logical unit numbers (LUNs) are still listed in the list of logical unit numbers (LUNs) 124, thereby eliminating the time and resources required to temporarily disable any write commands to source storage units which lack an available and synchronized target storage unit.

After the write commands have been temporarily disabled for the synchronized source storage units, the backup/restore application 122 creates snapshots of these source storage devices. For example, the backup/restore application 122 creates a snapshot of the personal computer 104 by splitting the first disk 112 from the personal computer 104, and creates a snapshot of the iMac® 106 by splitting the second disk 114 from the iMac® 106. In a "copy on write" example, the backup/restore application 122 creates a snapshot of the personal computer 104 by de-synchronizing the first disk 112 from the personal computer 104 to create a snapshot of the personal computer 104 at the point in time of de-synchronization, and then the backup/restore application 122 sends all writes following the de-synchronization to a different target storage device. In yet another example, the backup/restore application 122 tracks each write using a separate target storage device, such that any of these writes can be bookmarked, or labelled as a snapshot, thereby enabling a user to go to reference any point in time using the tracked writes. After the snapshots have been created, the backup/restore application 122 sends, via a backup/restore application interface, a request to enable any write commands to the source storage devices corresponding to the list of identifiers. For example, the backup/restore application 122 sends, via the backup/restore application interface 120, a request to enable any write commands to the personal computer 104 and the iMac® 106.

The backup/restore application 122 may save data from a target storage device to an auxiliary storage device, such as a tape or a disk drive. For example, the backup/restore application 122 saves data from the split first disk 112 and the split second disk 114 to the auxiliary storage device 116.

Figure 2:
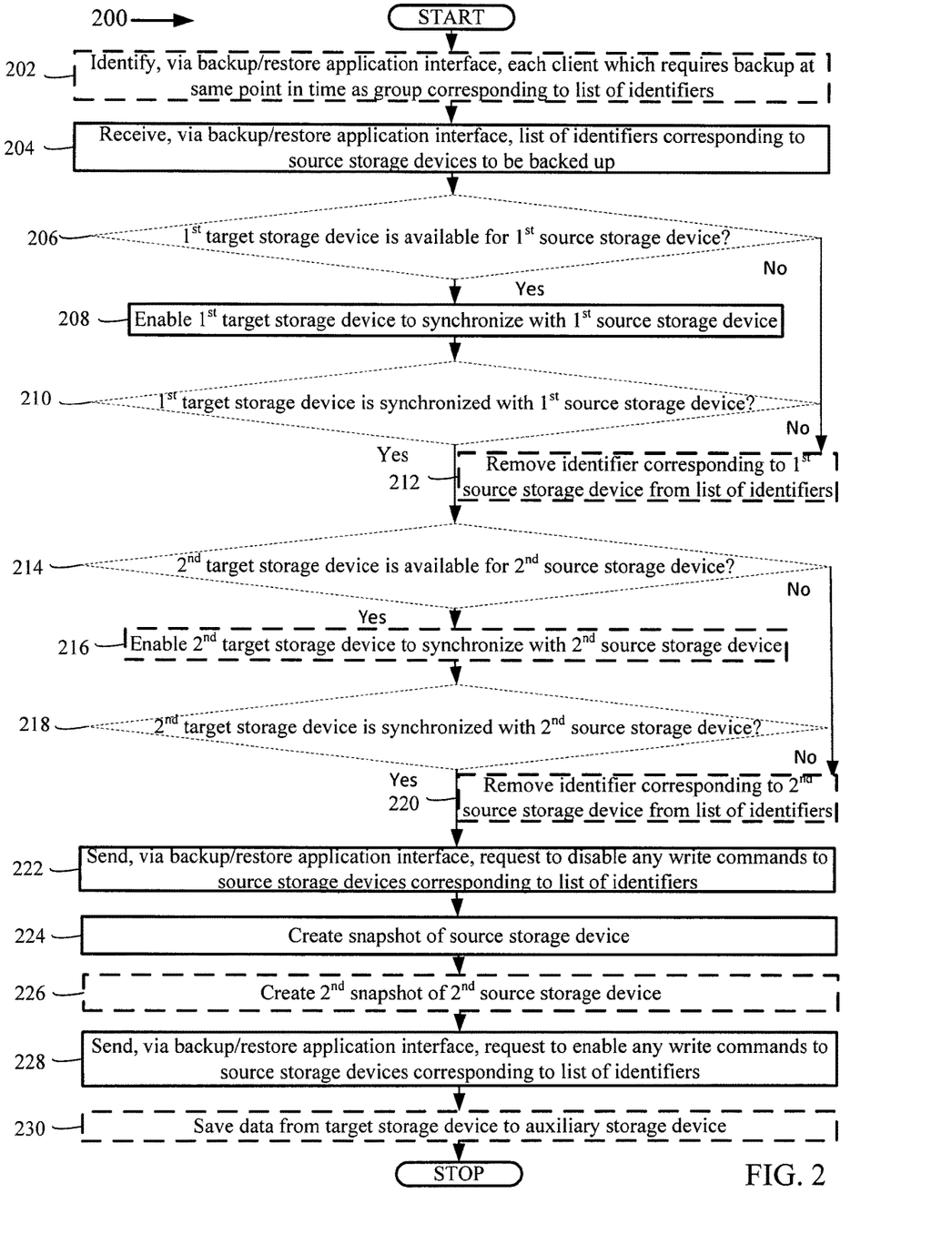
FIG. 2 is a flowchart that illustrates a method of synchronizing storage devices outside of disabled write windows, under an embodiment.

FIG. 2 is a flowchart that illustrates a method for synchronizing storage devices outside of disabled write windows, under an embodiment. Flowchart 200 illustrates method acts illustrated as flowchart blocks for certain steps involved in and/or between the clients 102-106 and/or the server 108 of FIG. 1.

Each client which requires backup at a same point in time is optionally identified as a group corresponding to a list of identifiers via a backup/restore application interface, block 202. For example, the backup/restore application 122 identifies, via the backup/restore application interface 120, the personal computer 104 and the iMac® 106, which require backup at the same point in time as a group which corresponds to the list of logical unit numbers (LUNs) 124. After a group corresponding to a list of identifiers is optionally identified, the list of identifiers corresponding to source storage devices to be backed up is received via a backup/restore application interface, block 204. For example, the backup/restore application 122 receives, via the backup/restore application interface 120, the list of logical unit numbers (LUNs) 124 corresponding to source storage devices to be backed up, including the personal computer 104.

Once a list of identifiers corresponding to source storage devices to be backed up is received, a determination is optionally made whether a target storage device is available for a source storage device, block 206. For example, the backup/restore application 122 determines whether the first disk 112 is available for mirroring the personal computer 104. If a target storage device is available for a source storage device, the flowchart 200 continues to block 208. If a target storage device is not available for a source storage device, the flowchart 200 proceeds to block 212. After a target storage device is identified as available for a source storage device, the target storage device is enabled to synchronize with the source storage device, block 208. For example, the backup/restore application 122 enables the first disk 112 to synchronize with the personal computer 104 in response to a determination that the first disk 112 is available for mirroring the personal computer 104.

In an embodiment, a determination is optionally made whether the target storage device is synchronized with the source storage device, block 210 once a target storage device is enabled to synchronize with a source storage device. For example, the backup/restore application 122 determines whether the first disk 112 is synchronized with the personal computer 104. If a target storage device is synchronized with a source storage device, the flowchart 200 proceeds to block 214. If a target storage device is not synchronized with a source storage device, the flowchart 200 continues to block 212. After an issue has been identified with a target storage device corresponding to a source storage device, an identifier corresponding to the source storage device is optionally removed from a list of identifiers, block 212. For example, the backup/restore application 122 removes the logical unit number (LUN) for the personal computer 104 from the list of logical unit numbers (LUNs) 124 because the first disk 112 is not available for the personal computer 104 and/or the first disk 112 is not synchronized with the personal computer 104.

In some embodiments, a determination is optionally made whether another target storage device is available for another source storage device, block 214 after a target storage device is confirmed as synchronized with a source storage device. For example, the backup/restore application 122 determines whether the second disk 114 is available for mirroring the iMac® 106. If the other target storage device is available for the other source storage device, the flowchart 200 continues to block 216. If the other target storage device is not available for the other source storage device, the flowchart 200 proceeds to block 220. After another target storage device is identified as available for another source storage device, the other target storage device is optionally enabled to synchronize with the other source storage device, block 216. For example, the backup/restore application 122 enables the second disk 114 to synchronize with the iMac® 106 in response to a determination that the second disk 114 is available for mirroring the iMac® 106.

After another target storage device is enabled to synchronize with another source storage device, a determination is optionally made whether the other target storage device is synchronized with the other source storage device, block 218. For example, the backup/restore application 122 determines whether the second disk 114 is synchronized with the iMac® 106. If the other target storage device is synchronized with the other source storage device, the flowchart 200 proceeds to block 222. If the other target storage device is not synchronized with the other source storage device, the flowchart 200 continues to block 220. After an issue has been identified with another target storage device corresponding to another source storage device, an identifier corresponding to the other source storage device is optionally removed from a list of identifiers, block 220. For example, the backup/restore application 122 removes the logical unit number (LUN) for the iMac® 106 from the list of logical unit numbers (LUNs) 124 because the second disk 114 is not available for the iMac® 106 and/or the second disk 114 is not synchronized with the iMac® 106.

In an embodiment, once another target storage device is confirmed as synchronized with another source storage device, a request to disable any write commands to source storage devices corresponding to a list of identifiers is sent via a backup/restore application interface, block 222. For example, the backup/restore application 122 sends, via the backup/restore application interface 120, a request to disable any write commands to the source storage devices corresponding to the list of logical unit numbers (LUNs) 124, including the personal computer 104. After requesting to disable any write commands to the source storage devices, a snapshot is created of a source storage device, block 224. For example, the backup/restore application 122 creates a snapshot of the personal computer 104 by splitting the first disk 112 from the personal computer 104. After requesting to disable any write commands to the source storage devices, another snapshot is optionally created of another source storage device, block 226. For example, the backup/restore application 122 creates a snapshot of the iMac® 106 by splitting the second disk 114 from the iMac® 106. Although the flowchart 200 describes creating the second snapshot after creating the first snapshot, all of the snapshots may be created at the same time.

In an embodiment, a request to enable any write commands to source storage devices corresponding to a list of identifiers is sent via a backup/restore application interface, block 228 after creating any snapshots. For example, the backup/restore application 122 sends, via the backup/restore application interface 120, a request to enable any write commands to the source storage devices corresponding to the list of logical unit numbers (LUNs) 124, including the personal computer 104. After enabling any write commands to source storage devices, data from a target storage device is optionally saved to an auxiliary storage device, block 230. For example, the backup/restore application 122 saves data from the split first disk 112 to the auxiliary storage device 116.

Although FIG. 2 depicts the blocks 202-230 occurring in a specific order, the blocks 202-230 may occur in another order. In other implementations, each of the blocks 202-230 may also be executed in combination with other blocks and/or some blocks may be divided into a different set of blocks.

Figure 3:
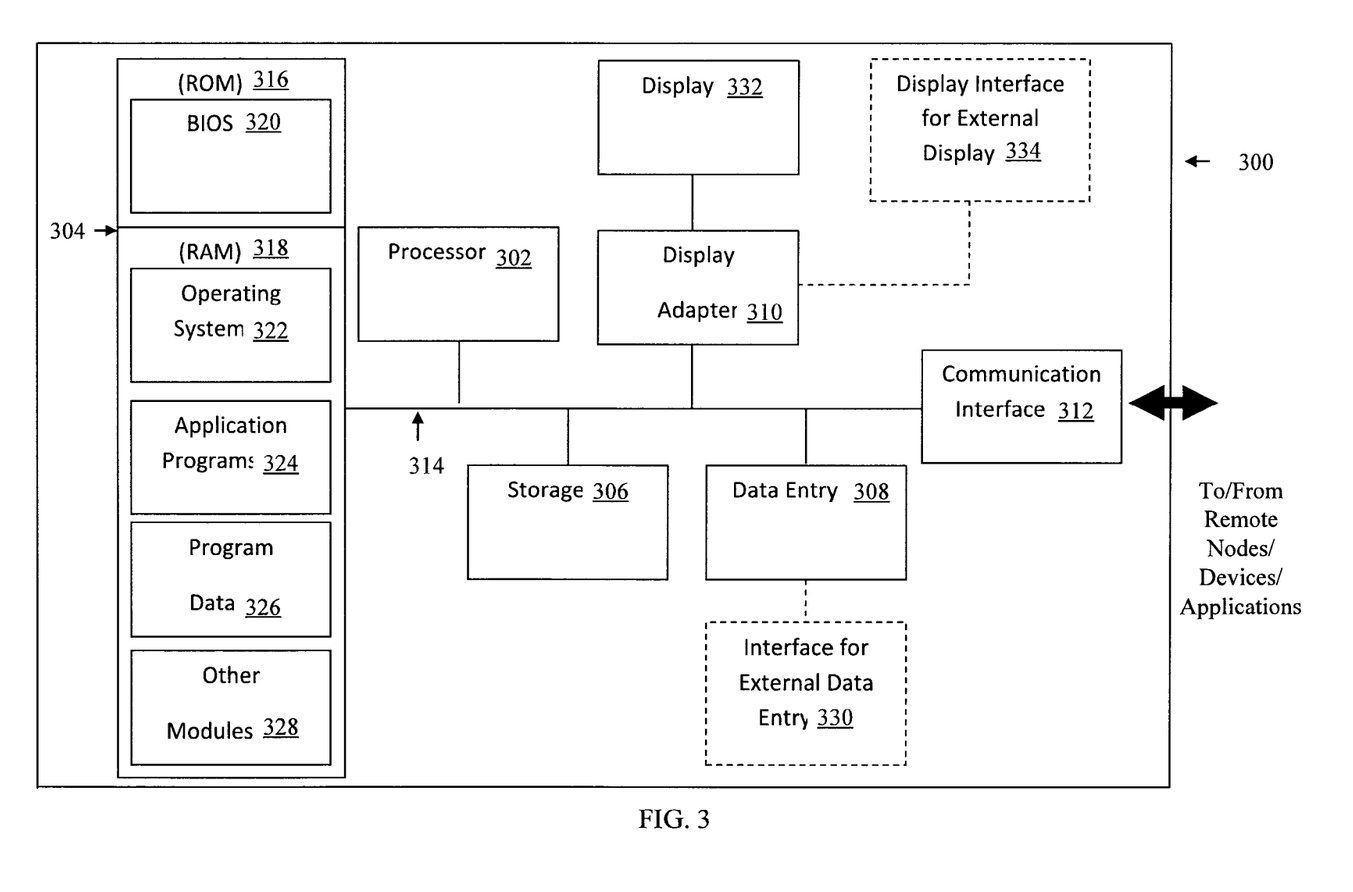
FIG. 3 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for synchronizing storage devices outside of disabled write windows, the system comprising:
   a processor-based application, which when executed on a computer, will cause the processor to:
   identify, via a backup/restore application interface, each client which requires backup at a same point in time as a group, the group corresponding to a list of identifiers, the list of identifiers corresponding to a plurality of source storage devices;
   receive, via the backup/restore application interface, the list of identifiers corresponding to the plurality of source storage devices to be backed up;
   enable synchronization, prior to initiation of a disable write window, of a target storage device with a source storage device of the plurality of source storage devices;
   determine whether another target storage device is available for another source storage device of the plurality of source storage devices;
   remove an identifier corresponding to the other source storage device from the list of identifiers in response to a determination that the other target storage device is not available for the other source storage device;
   send, via the backup/restore application interface, a request to initiate the disable write window in which any write commands to the plurality of source storage devices corresponding to the list of identifiers are disabled in response to a synchronization confirmation indicating the target storage device and the source storage device mirror each other;
   create a snapshot of the source storage device during the disable write window initiated based on receipt of the synchronization confirmation; and
   send, via the backup/restore application interface, a request to enable any write commands to the plurality of source storage devices corresponding to the list of identifiers.

2. The system of claim 1, wherein the processor-based application further causes the processor to determine whether the target storage device is available for the source storage device; and wherein enabling the target storage device to synchronize with the source storage device is in response to a determination that the target storage device is available for the source storage device.

3. The system of claim 2, wherein the processor-based application further causes the processor to remove an identifier corresponding to the source storage device from the list of identifiers in response to a determination that the target storage device is not available for the source storage device.

4. The system of claim 1, wherein the processor-based application further causes the processor to determine whether the target storage device is synchronized with the source storage device; and remove an identifier corresponding to the source storage device from the list of identifiers in response to a determination that the target storage device is not synchronized with the source storage device.

5. The system of claim 1, wherein the processor-based application further causes the processor to:
   enable the other target storage device to synchronize with the other source storage device, prior to initiation of the disable write window, in response to a determination that the other target storage device is available for the other source storage device;
   determine whether the other target storage device and the other source storage device mirror each other;
   remove the identifier corresponding to the other source storage device from the list of identifiers in response to a synchronization determination indicating that the other target storage device and the other source storage device do not mirror each other; and
   create another snapshot of the other source storage device.

6. The system of claim 1, wherein the processor-based application further causes the processor to save data from the target storage device to an auxiliary storage device.

7. A computer-implemented method for synchronizing storage devices outside of disabled write windows, the method comprising:

identifying, via a backup/restore application interface, each client which requires backup at a same point in time as a group, the group corresponding to a list of identifiers, the list of identifiers corresponding to a plurality of source storage devices;

receiving, via the backup/restore application interface, the list of identifiers corresponding to the plurality of source storage devices to be backed up;

enabling synchronization, prior to initiation of a disable write window, of a target storage device with a source storage device of the plurality of source storage devices;

determining whether another target storage device is available for another source storage device of the plurality of source storage devices;

removing an identifier corresponding to the other source storage device from the list of identifiers in response to a determination that the other target storage device is not available for the other source storage device;

sending, via the backup/restore application interface, a request to initiate the disable write window in which any write commands to the plurality of source storage devices corresponding to the list of identifiers are disabled in response to a synchronization confirmation indicating the target storage device and the source storage device mirror each other;

creating a snapshot of the source storage device during the disable write window initiated based on receipt of the synchronization confirmation; and sending, via the backup/restore application interface, a request to enable any write commands to the plurality of source storage devices corresponding to the list of identifiers.

8. The method of claim 7, wherein the method further comprises determining whether the target storage device is available for the source storage device; and wherein enabling the target storage device to synchronize with the source storage device is in response to a determination that the target storage device is available for the source storage device.

9. The method of claim 8, wherein the method further comprises removing an identifier corresponding to the source storage device from the list of identifiers in response to a determination that the target storage device is not available for the source storage device.

10. The method of claim 7, wherein the method further comprises determining whether the target storage device is synchronized with the source storage device; and removing an identifier corresponding to the source storage device from the list of identifiers in response to a determination that the target storage device is not synchronized with the source storage device.

11. The method of claim 7, wherein the method further comprises:

enabling the other target storage device to synchronize with the other source storage device, prior to initiation of the disable write window, in response to a determination that the other target storage device is available for the other source storage device;

determining whether the other target storage device and the other source storage device mirror each other;

removing the identifier corresponding to the other source storage device from the list of identifiers in response to a synchronization determination indicating that the other target storage device and the other source storage device do not mirror each other; and creating another snapshot of the other source storage device.

12. The method of claim 7, wherein the method further comprises saving data from the target storage device to an auxiliary storage device.

13. A computer program product, comprising a non-transitory computer-readable medium having a computer-readable program code embodied therein to be executed by one or more processors, the program code including instructions to:

identify, via a backup/restore application interface, each client which requires backup at a same point in time as a group, the group corresponding to a list of identifiers, the list of identifiers corresponding to a plurality of source storage devices;

receive, via the backup/restore application interface, the list of identifiers corresponding to the plurality of source storage devices to be backed up;

enable synchronization, prior to initiation of a disable write window, of a target storage device with a source storage device of the plurality of source storage devices;

determine whether another target storage device is available for another source storage device of the plurality of source storage devices;

remove an identifier corresponding to the other source storage device from the list of identifiers in response to a determination that the other target storage device is not available for the other source storage device;

send, via the backup/restore application interface, a request to initiate the disable write window in which any write commands to the plurality of source storage devices corresponding to the list of identifiers are disabled in response to a synchronization confirmation indicating the target storage device and the source storage device mirror each other;

create a snapshot of the source storage device during the disable write window initiated based on receipt of the synchronization confirmation; and send, via the backup/restore application interface, a request to enable any write commands to the plurality of source storage devices corresponding to the list of identifiers.

14. The computer program product of claim 13, wherein the program code further includes instructions to determine whether the target storage device is available for the source storage device; and to remove an identifier corresponding to the source storage device from the list of identifiers in response to a determination that the target storage device is not available for the source storage device; wherein enabling the target storage device to synchronize with the source storage device is in response to a determination that the target storage device is available for the source storage device.

15. The computer program product of claim 13, wherein the program code further includes instructions to determine whether the target storage device is synchronized with the source storage device; and remove an identifier corresponding to the source storage device from the list of identifiers in response to a determination that the target storage device is not synchronized with the source storage device.

16. The computer program product of claim 13, wherein the program code further includes instructions to:
- enable the other target storage device to synchronize with the other source storage device, prior to initiation of the disable write window, in response to a determination that the other target storage device is available for the other source storage device;
- determine whether the other target storage device and the other source storage device mirror each other;
- remove the identifier corresponding to the other source storage device from the list of identifiers in response to a synchronization determination indicating that the other target storage device and the other source storage device do not mirror each other; and
- create another snapshot of the other source storage device.

17. The system of claim 1, wherein the processor-based application further causes the processor to flush pending write commands, prior to initiation of the disable write window, to the plurality of source storage devices corresponding to the list of identifiers.

\* \* \* \* \*